Figure 1:
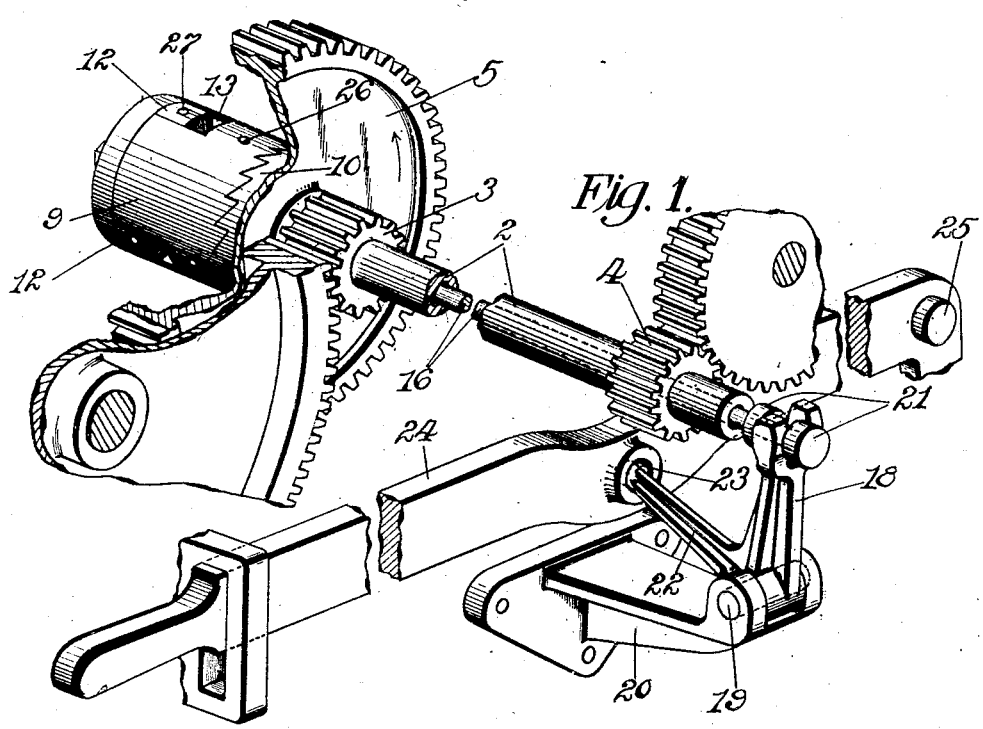

May 26, 1925.

J. K. WHITTIER ET AL 1,539,811

CLUTCH MECHANISM

Filed Aug. 7, 1920

Inventor.
John K. Whittier
Robert S. Curley
by J. H. McCready
their Atty.

Patented May 26, 1925.

1,539,811

UNITED STATES PATENT OFFICE.

JOHN K. WHITTIER AND ROBERT S. CURLEY, OF LOWELL, MASSACHUSETTS, ASSIGNORS TO SACO-LOWELL SHOPS, OF BOSTON, MASSACHUSETTS, A CORPORATION OF MASSACHUSETTS.

CLUTCH MECHANISM.

Application filed August 7, 1920. Serial No. 401,863.

*To all whom it may concern:*

Be it known that we, JOHN K. WHITTIER and ROBERT S. CURLEY, citizens of the United States, and both residing at Lowell, in the county of Middlesex and State of Massachusetts, have invented a new and useful Improvement in Clutch Mechanisms, of which the following description, in connection with the accompanying drawings, is a specification, like reference characters on the drawings indicating like parts in the several figures.

This invention relates to clutch mechanisms and is especially concerned with the requirements of mechanisms of this character for controlling the calender rolls of the lap winding machines used in the cotton industry.

It is the chief object of the invention to devise a clutch mechanism which will be simple but sturdy in construction, which can be economically manufactured, will not be subject to rapid wear or deterioration, and will be very reliable in operation. It is also an object of the invention to devise a mechanism of this character which will meet the practical requirements for such a mechanism in a lap winding machine.

The nature of the invention will be readily understood from the following description when read in connection with the accompanying drawings, and the novel features will be particularly pointed out in the appended claims.

Figure 2:
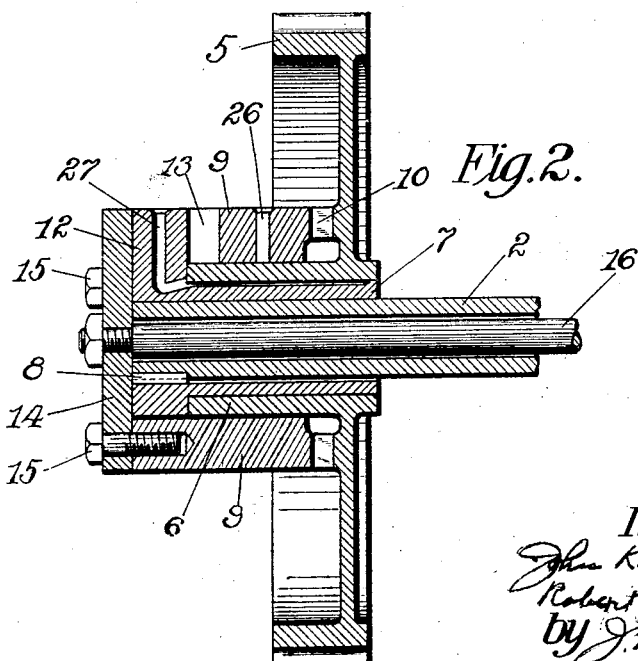

Referring now to the drawings,

Figure 1 is an angular view illustrating a mechanism embodying the present invention and designed especially for use in a lap winding machine; and Fig. 2 is a vertical cross sectional view through the clutch mechanism shown in Fig. 1.

In the construction shown, 2 designates the driving shaft for the calender rolls. This shaft is hollow and has mounted fast thereon two pinions 3 and 4, respectively, at opposite sides of the machine which drive the two sets of calender rolls through suitable gearing. The shaft 2 is driven through a novel mechanism which forms an important feature of the present invention and by means of which it may be connected to, or disconnected from, a gear 5 that is mounted to rotate freely on the shaft 2. A pinion (not shown) mounted on the main driving shaft of the lap winding machine meshes with this gear 5 and drives it constantly.

Referring now to Fig. 2, it will be seen that the gear 5 is provided with an extended hub 6 and runs freely on a sleeve or bushing 7 which is secured by a key 8 to the shaft 2. A clutch sleeve 9 loosely encircles the hub 6 and is provided at one end with a series of clutch teeth to engage a similar set of teeth 10 formed on the gear 5. For the purpose of driving the sleeve 9 in unison with the shaft 2 the bushing 7 has a spider formed integrally therewith comprising three radiating arms 12 that extend into slots 13 formed in the clutch sleeve 9. A plate 14 is secured by bolts 15 to the outer end of the sleeve 9, and an operating rod 16 is secured at one end to this plate and extends through the hollow shaft 2 to the opposite side of the machine where it is straddled by the forked arm 18 of a bell crank lever. This lever is fulcrumed at 19 on a stationary bracket 20 secured to the machine frame. Two collars 21—21, Fig. 1, fast on the rod 16 engage opposite faces of the arm 18 so that the shaft can rotate freely with reference to the arm 18 but is moved longitudinally thereby. The opposite arm 22 of the bell crank lever is provided with a ball end which is located in a socket 23 in the drop lever 24 of the lap winding machine. This lever is fulcrumed on the pin 25.

It will be seen from an inspection of Fig. 1 that when the lever is in its raised position the clutch parts 9 and 10 will be held in clutching engagement and that when the parts are in this relationship the calender rolls will be driven. When the drop lever 24 is moved either automatically or by hand into its lower position, this movement will be transmitted through the rod 16 and plate 14 to the sleeve 9, sliding this sleeve toward the left as the parts appear in Figs. 1 and 2, moving it out of engagement with the clutch teeth 10 on the gear 5 and thereby interrupting the rotative movement of the shaft 2 and the parts driven thereby.

It will now be evident that this invention provides a clutch mechanism of exceedingly simple construction, which can be manufactured very economically and in which the parts are of very sturdy construction and therefore amply capable of withstanding the strains to which they are subjected. A further advantage of this construction is that the clutching and unclutching movement is transmitted longitudinally of the axis of the rotating parts. Consequently, the tendency for the parts to jam or bind is reduced to a minimum.

For convenience in oiling the parts, one or more oil holes 26 are drilled through the sleeve 9 and an oil hole 27 is drilled through one or more of the spider arms 12 and communicates with an oil groove in the bushing 7. The friction surfaces, therefore, can easily be kept well lubricated so that the clutch will work very freely.

What is claimed as new is:

1. A clutch mechanism of the character described, comprising, in combination, a hollow rotatable shaft, a gear rotatably mounted on said shaft and having an extended hub, a sleeve slidable on said hub longitudinally thereof, said sleeve and gear having cooperating clutch portions, a spider fast on said shaft and connecting said sleeve with said shaft, and a rod connected with said sleeve and extended through said shaft to move the sleeve into and out of clutching engagement with said gear.

2. A clutch mechanism of the character described, comprising, in combination, a hollow rotatable shaft, a gear rotatably mounted on said shaft and having an extended hub, a sleeve slidable on said hub longitudinally thereof, said sleeve and gear having cooperating toothed portions, a spider fast on said shaft having arms radiating therefrom, said sleeve being provided with slots into which said arms extend, and a rod connected with said sleeve and extending through said shaft to move the sleeve into and out of engagement with the toothed portion of said gear.

3. A clutch mechanism for controlling the calender rolls of a lap winding machine, comprising, in combination, a hollow driving shaft for said rolls, a driving gear loosely mounted on said shaft and having a toothed portion, a clutch sleeve slidable on said shaft and toothed to engage said portion, a spider connecting said sleeve and shaft to cause them to rotate in unison, a rod connected with said sleeve and extending through said shaft, a bell crank lever connected with said rod to move it axially of said shaft, and another lever connected with said bell crank lever to operate it.

4. A clutch mechanism of the character described comprising, in combination, a rotatable shaft, a member rotatably mounted thereon and provided with a toothed clutch part, a clutch sleeve encircling said shaft and mounted to slide longitudinally thereof, said sleeve being toothed to engage said toothed part, a spider secured fast to said shaft and having arms radiating therefrom, said sleeve being provided with slots into which said arms extend, whereby said spider is operative to drive said sleeve, and a rod mounted in said shaft and connected with said sleeve for sliding said sleeve to engage and disengage its teeth with the teeth of said clutch part.

In testimony whereof we have signed our names to this specification.

JOHN K. WHITTIER.
ROBERT S. CURLEY.